UNITED STATES PATENT OFFICE.

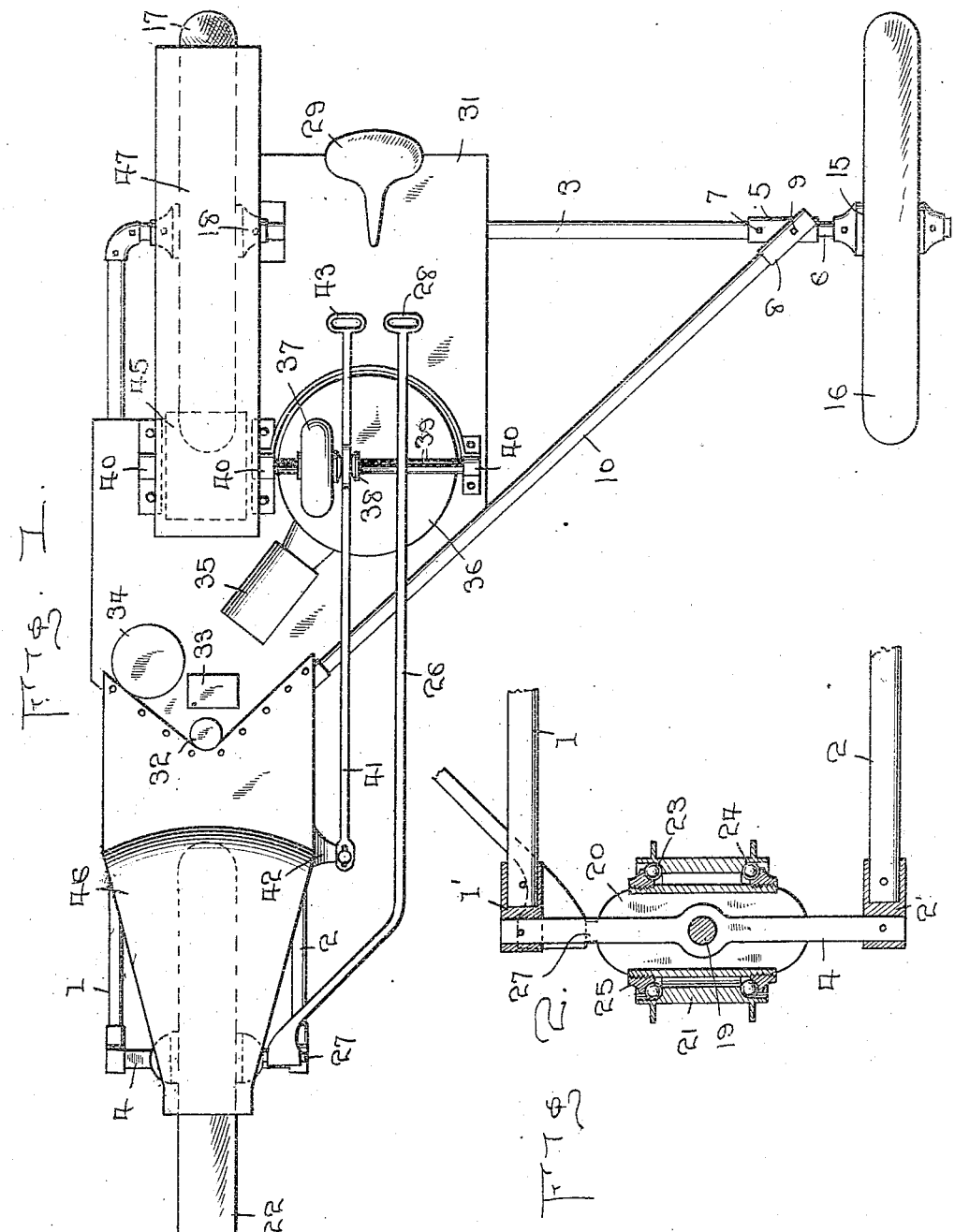

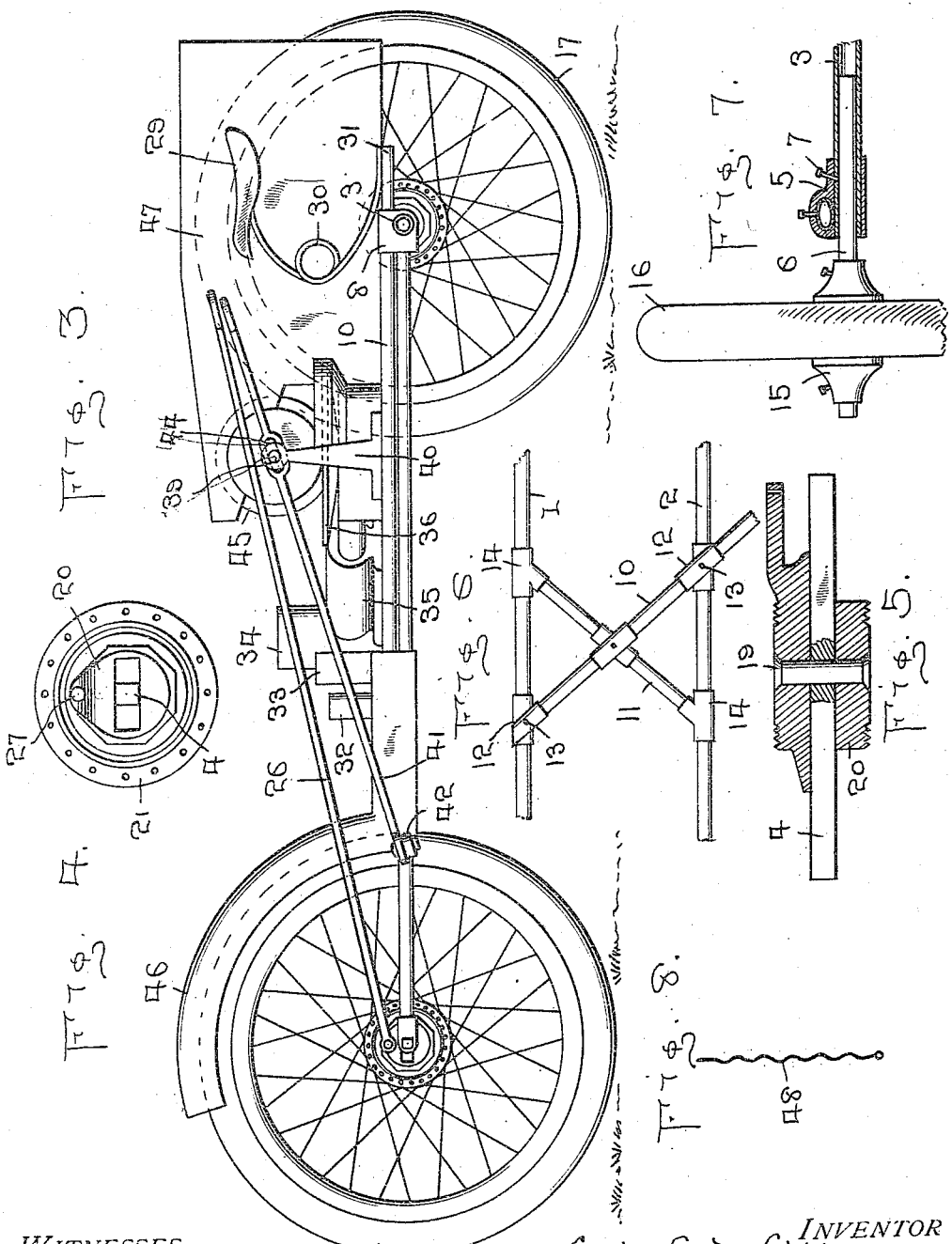

WILLIAM H. WILLIAMS, OF STATESBORO, GEORGIA.

THREE-WHEELED MOTOR-DRIVEN VEHICLE.

1,036,396.

Specification of Letters Patent.

Patented Aug. 20, 1912.

Application filed January 20, 1912. Serial No. 672,421.

*To all whom it may concern:*

Be it known that I, WILLIAM H. WILLIAMS, a citizen of the United States, residing at Statesboro, in the county of Bulloch and State of Georgia, have invented certain new and useful Improvements in Three-Wheeled Motor-Driven Vehicles; and I do hereby declare the following to be a full, clear, and exact description of the invention, such as will enable others skilled in the art to which it appertains to make and use the same.

My invention relates to new and useful improvements in vehicles and more particularly to three-wheeled motor driven vehicles.

An object of my invention is to provide a motor cycle of the class described of light and compact form.

A further object of my invention is to provide driving mechanism whereby power from an engine may be readily transmitted to one of the wheels so that the vehicle may be caused to travel in either direction.

A still further object of my invention is to provide means whereby the vehicle may be easily guided and caused to travel in any path.

Other objects and advantages of my invention will be hereinafter made clearly apparent in the specification and pointed out in the claims.

In the accompanying drawings I have shown the preferred form which my invention may take.

In said drawings, Figure 1 is a top plan view, showing my improved form of three-wheeled motorcycle. Fig. 2 is a detail sectional view on an enlarged scale taken horizontally through the steering wheel hub. Fig. 3 is a side elevation of my motorcycle, a portion thereof being broken away. Fig. 4 is a side elevation, showing the hub of the guiding wheel, Fig. 5 is a vertical sectional view through a portion of the steering hub. Fig. 6 is a detail view of a portion of the framework. Fig. 7 is a vertical sectional view through one end of the rear axle, showing the manner in which the stub shaft carrying the wheel for one end of the axle is adjustably secured in the latter, said view also showing the manner in which the rear end of the diagonal brace plate of the frame is secured to the rear axle, and. Fig. 8 is a detail view of a modified form of spoke for the wheels.

Referring more particularly to the drawings in which similar reference numerals designate corresponding parts throughout the several views, 1 and 2 represent the longitudinal bars of the frame, the rear ends of which are connected to the rear axle 3. The front ends of the longitudinal bars 1 and 2 are connected by means of the stationary front axle 4 having its opposite ends secured to the caps 1' 2' carried respectively by the bars 1 and 2.

The rear end of the longitudinal bar 1 is preferably secured to one end of the rear axle 3 while the rear end of the longitudinal bar 2 is secured to the rear axle 3, a short distance from this end, the bars 1 and 2 being spaced only a short distance apart and lying parallel to one another. The rear axle 3 has secured over its opposite end a short sleeve 5 and a stub shaft 6 is adjustably secured within this end of the axle 3, over which the sleeve 5 is positioned, and held in place by a set screw 7 passed through the sleeve 5 and through the axle 3 and bearing against the stub shaft 6.

The sleeve 5 has a hollow enlargement 8 upon its upper face and extending at an angle to the sleeve, and within the enlargement 8 is secured, by means of a set screw 9, the end of the diagonal bar 10 which has its forward portion secured upon the longitudinal bars 1 and 2 and upon a cross brace 11, by means of suitable double or cross sleeves 12 and set screws 13 passed through said sleeves. The cross brace 11 is positioned diagonally between the bars 1 and 2 and beneath the diagonal bar 10 and at right angles to the latter and has its opposite ends secured in T's 14 carried by said bars 1 and 2.

The stub shaft 6 carries the spindle 15 upon which the rear wheel 16 is mounted while the opposite rear wheel 17 is mounted upon the spindle 18 between the rear ends of the longitudinal bars 1 and 2 of the framework. The front axle 4 has pivotally mounted thereon by means of a king bolt 19, a spindle 20 over which the hub 21 of the front wheel 22 is positioned, said hub 21 being provided with run ways 23 within which bearing balls 24 are positioned, said balls working upon the bearing rings 25 which are threaded upon the opposite ends of the spindle 20. The central portion of the spindle 20 is hollowed out to allow said spindle to swing in either direction upon the king bolt 19 passed through the spindle and through the stationary front axle 4.

The spindle 20 is swung to turn the hub 21 and wheel 22 to either side by means of the long lever 26, the forward end of which is secured to the arm 27 projecting from one end of the spindle, while the opposite end of the lever is formed into a hand hold 28 to be grasped for operating the lever. The hand hold 28 is in such position as to be within reach of the operator without leaving the seat 29 carried by the spring seat support 30 secured to the platform 31.

The platform 31 is supported upon the rear axle 3, longitudinal bars 1 and 2 and the cross brace 11 of the framework and is positioned forwardly of the rear wheel 17 and to the side thereof, extending part of the way to the opposite rear wheel 16. Upon the platform 31 are positioned the lubricating oil tank 32, batteries 33 and gasolene tank 34 which are properly connected to the engine 35 also positioned upon the platform 31.

A short distance from the engine 35 is a friction disk 36 which is mounted upon the crank shaft of the engine 35. Engaged with the upper face of the friction disk 36 is a friction wheel 37, the hub 38 of which is slidably mounted upon the round shaft 39 mounted in suitable bracket bearings 40 positioned above and supported upon the platform 31, said shaft 39 extending transversely of the platform and having a longitudinal groove to accommodate a suitable key carried by the wheel 37. The friction wheel 37 and its hub 38 may be moved longitudinally upon the shaft 39 by means of the controlling lever 41 which has its forward end pivoted to an arm 42 projecting from the side of the platform 31 while its rear end is formed into a loop or hand hold 43 adjacent the hand hold 28. The lever 41 is enlarged and provided with an elongated slot 44 to permit of engagement of the lever around the hub 38 of the wheel 37 to move the same upon the shaft 39. Between two of the bracket bearings 40 is positioned a friction wheel 45 which is engaged with the periphery of the rear wheel 17 to rotate the latter and thus propel the vehicle.

Suitable mud guards 46 and 47 are secured to the platform 31 and extend partly over the front wheel 22 and the rear wheel 17 respectively, as will be clearly understood.

In Fig. 8 I have shown a modified form of spoke 48 which may be employed for the wheels of the vehicle to give a more resilient action to the wheels, as the spokes 48 are crimped to cause the spokes to give readily and absorb shocks incident to the wheels coming in contact with stones or other obstructions.

Thus it will be seen that I have provided a three-wheeled motor propelled vehicle of improved construction and operation and it will be understood that the speed of the vehicle may be varied by shifting the friction wheel 37 toward the center of the friction disk 36 or toward the edge thereof. It will further be evident that the vehicle may be operated in the opposite direction by shifting the friction wheel 37 beyond the center of the friction disk 36 and toward the opposite edge of said friction disk or the end of the shaft 39. Should the friction wheel 37 be moved to the center of the friction disk 36 and held in this position it will act as a brake to stop the vehicle. When it is desired to turn the vehicle to either side, the hand hold 28 is grasped and the lever 26 swung in the proper direction to turn the front wheel 22 as previously described.

What I claim is:—

1. A motor propelled vehicle comprising a framework composed of parallel longitudinal bars, a transverse bar connecting the rear ends of the longitudinal bars and projecting for some distance beyond one of said bars, said transverse bar serving as the rear axle of the vehicle, a diagonal bar connecting the free end of the bar forming the rear axle and crossing the longitudinal bars, said diagonal bar being connected to the transverse and longitudinal bars, a front axle connecting the forward ends of the longitudinal bars, a spindle upon the front axle, a wheel upon the spindle, rear wheels upon the transverse bar serving as the rear axle, a supporting platform secured upon the bars, and means upon the platform for propelling the vehicle.

2. A motor propelled vehicle comprising a framework formed of longitudinal and diagonal bars, said bars being connected, a transverse bar connected to the rear end of one of the longitudinal bars, said transverse bar being secured to and projecting beyond the other longitudinal bar, one of the diagonal bars being extended and secured to the transverse bar adjacent its free end, rear wheels mounted upon the transverse bar, means for connecting the forward ends of the longitudinal bars, a front wheel secured upon the connecting means, a platform secured upon the bars between the wheels, and means upon the platform for propelling the vehicle.

In testimony whereof I have signed my name to this specification in the presence of two subscribing witnesses.

WILLIAM H. WILLIAMS.

Witnesses:
C. A. NEALE,
W. T. FITZGERALD.